United States Patent
Tang et al.

(10) Patent No.: US 6,487,907 B1
(45) Date of Patent: Dec. 3, 2002

(54) MICROGYROSCOPE WITH INTEGRATED VIBRATORY ELEMENT

(75) Inventors: Tony K. Tang, Glendale, CA (US); Damien C. Rodger, Chelmsford, MA (US); Roman C. Gutierrez, La Crescenta, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/612,325

(22) Filed: Jul. 6, 2000

Related U.S. Application Data

(60) Provisional application No. 60/142,850, filed on Jul. 8, 1999.

(51) Int. Cl.[7] ............................................. G01P 9/00
(52) U.S. Cl. ..................................................... 73/504.02
(58) Field of Search .......................... 73/504.02, 504.04, 73/504.12, 504.14, 504.15, 514.29, 514.35, 514.16, 514.32

(56) References Cited

U.S. PATENT DOCUMENTS

| | | | | |
|---|---|---|---|---|
| 5,002,940 A | * | 3/1991 | Ogawa | 73/505 |
| 5,203,208 A | * | 4/1993 | Bernstein | 73/504.12 |
| 5,894,090 A | * | 4/1999 | Tang et al. | 73/504.02 |
| 6,079,272 A | * | 6/2000 | Stell et al. | 73/504.12 |
| 6,164,134 A | * | 12/2000 | Cargille | 73/504.02 |

* cited by examiner

*Primary Examiner*—Helen Kwok
(74) *Attorney, Agent, or Firm*—Fish & Richardson P.C.

(57) ABSTRACT

A microgyroscope having a suspended vertical post uses the Coriolis force to detect the rotation rate. The microgyroscope consists of a single vertical post which is the rotation rate sensing element. The vertical post is formed from the same silicon wafers as the rest of the microgyroscope. A first portion of the vertical post and the clover-leaf structure are made from a first silicon wafer. A second portion of the vertical post and the baseplate are made from a second silicon wafer. The two portions are then bonded together to from the clover-leaf gyroscope with an integrated post structure.

18 Claims, 1 Drawing Sheet

MICROGYROSCOPE WITH INTEGRATED VIBRATORY ELEMENT

CROSS-REFERENCE TO RELATED APPLICATIONS

This application claims benefit of U.S. Provisional Application No. 60/142,850, filed Jul. 8, 1999.

ORIGIN OF INVENTION

The invention described herein was made in the performance of work under a NASA contract, and is subject to the provisions of Public Law 96-517 (35 U.S.C. §202) in which the Contractor has elected to retain title.

TECHNICAL FIELD

This invention relates to vibratory gyroscopes, and more particularly to silicon micromachined vibratory gyroscopes.

BACKGROUND

Multi-axis sensors are highly desirable for inertial sensing of motion in three dimensions. Previously, such sensors were constructed of relatively large and expensive electromagnetic and optical devices. More recently, micromechanical sensors have been fabricated using semiconductor processing techniques. Microelectrical mechanical or "MEMS" systems allow formation of physical features using semiconductor materials and processing techniques. These techniques enable the physical features to have relatively small sizes and be precise. Specifically, micromechanical accelerometers and gyroscopes have been formed from silicon wafers by using photolithographic and etching techniques. Such microfabricated sensors hold the promise of large scale production and therefore low cost.

The integration of three gyroscopic sensors to measure the rotation rates about the three separate axes coupled with three accelerometric sensors to measure the acceleration along the three axes on a single chip would provide a monolithic, six degree-of-freedom inertial measurement system capable of measuring all possible translations and orientations of the chip. There has been some difficulty in constructing a high-performance, or sensitive vibratory rate gyroscope to measure the rotation about the axis normal to the plane of the silicon chip, i.e., the Z-axis.

In a vibratory gyroscope, the Coriolis effect induces energy transfer from the driver input vibratory mode to another mode which is sensed or output during rotation of the gyroscope. Silicon micromachined vibratory gyroscopes are integratable with silicon electronics. These devices are capable of achieving high Q factors, can withstand high g shocks due to their small masses, are insensitive to linear vibration and consume little power. However, most of these micromachined gyroscopes have a very small rotation response, since their input and output vibration modes have different mode shapes and resonant frequencies. The use of different resonant modes also makes these devices very temperature sensitive due to the different temperature dependency of each of the modes. These devices usually have very high resonant frequencies resulting in low responsivity, since the Coriolis induced response is inversely proportional to the resonant frequency of the structure. Finally, due to the small mass of the structure, thermal noise limits the ultimate performance and use of microgyroscopes. For these reasons, micromachined vibratory gyroscopes have not been used for precision navigation and attitude control applications, but have been employed primarily for automotive applications in which extreme low cost is a major driving factor and performance is set at a lower premium.

Previous microgyroscope designs require manual assembly of the rotation rate sensing element (the vertical post) onto the clover-leaf structure. This process induced asymmetrical stresses in the clover-leaf structure and changes in the mechanical resonant frequencies and model shapes. These changes in the mechanical resonant frequencies and model shapes result in performance variations from device to device under either constant or varying temperature conditions.

SUMMARY

The present invention is a microgyroscope which uses the Coriolis force to detect the rotation rate. The microgyroscope consists of a single vertical post which is the rotation rate sensing element. The vertical post is formed from the same silicon wafers as the rest of the microgyroscope. A first portion of the vertical post and the clover-leaf structure are made from a first silicon wafer. A second portion of the vertical post and the baseplate are made from a second silicon wafer. The two portions are then bonded together to from the clover-leaf gyroscope with an integrated post structure.

DESCRIPTION OF DRAWINGS

These and other features and advantages of the invention will become more apparent upon reading the following detailed description and upon reference to the accompanying drawings.

DETAILED DESCRIPTION

Figure 1:
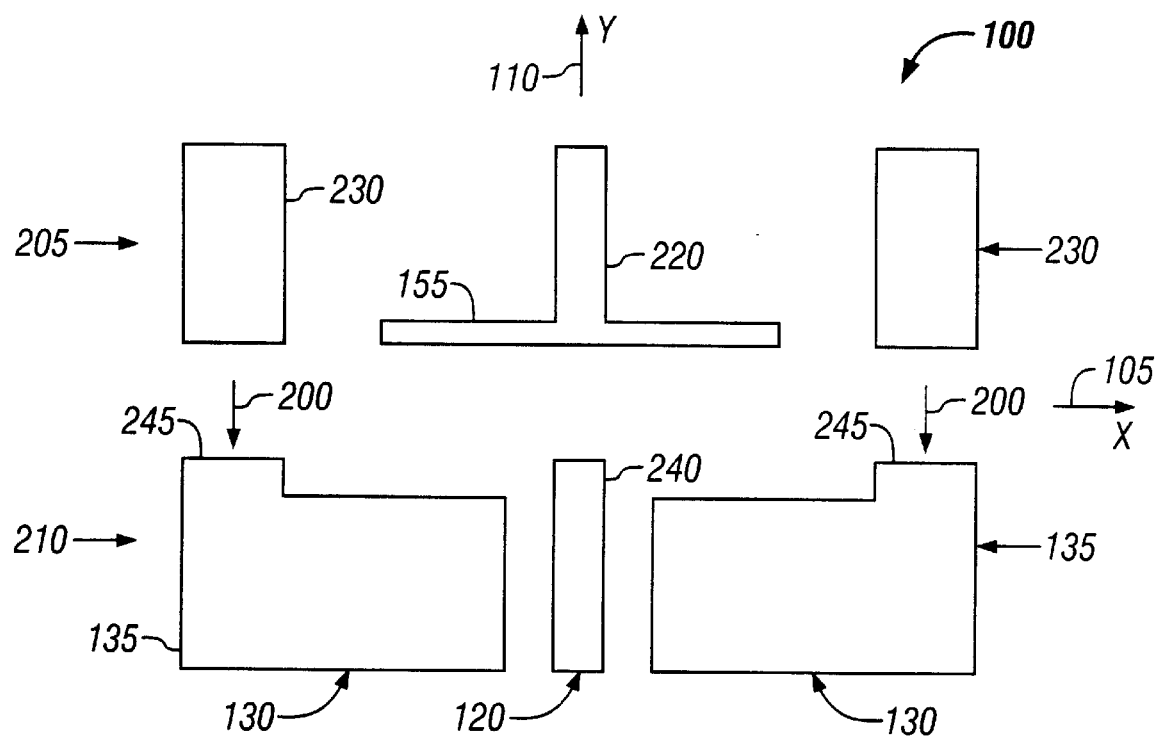
FIG. 1 is a side view of the components of a microgyroscope constructed according to one embodiment of the present invention.

FIG. 1 is a side view of a microgyroscope 100 constructed according to one embodiment of the present invention. The microgyroscope 100 detects forces in the x-direction 105, the y-direction 110, and in the z-direction. Vertical capacitors 130 surround the vertical post 120. The vertical capacitors 130 provide electrostatic actuation-of the vertical post 120 and allow for capacitive detection of the motions of the vertical post 120.

A first section.205 of the microgyroscope 100 is made from a first silicon wafer and a second section 210 of the microgyroscope is made from a second silicon wafer. The first section 205 of the microgyroscope 100 includes a first portion 220 of the vertical post 120 including flanges 155 and first portions 230 of the vertical capacitors 130. The second section 210 of the microgyroscope 100 includes a second portion 240 of the vertical post 120, second portions 245 of the vertical capacitors 130, and a baseplate 135. Although the invention is described with the vertical capacitors 130 being constructed of first portions 230 and second portions 245, it can be appreciated that the first portions 230 and second portions 245 may be electrically isolated to create even more independent vertical capacitors 130.

To construct the microgyroscope 100, the first section 205 is positioned above the section 210. The first section 205 is lowered as indicated by reference numeral 200 onto the second section 210. The first and second sections 205, 210 are then bonded together using standard bonding techniques such as-metal-to-metal bonding. The first and second sections 205, 210 are bonded in a position so that the first portion 220 and the second portion 240 of the vertical post 120 are aligned to form one continuous vertical post 120. The first portions 230 of the vertical capacitors 130 are aligned with the second portions 245 of the vertical capacitors 130 on the baseplate 135. Of course, the first portions 235 and the second portions 230 may be electrically isolated. Thus, once the first section 205 is connected to the second section 210, the vertical post 120 is positioned with the microgyroscope 100.

Figure 2:
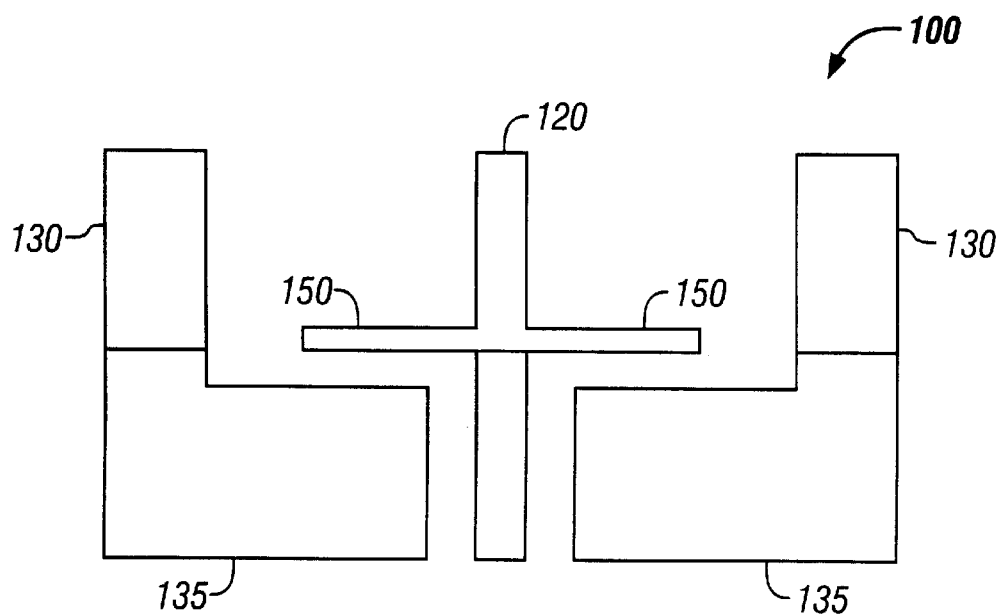
FIG. 2 is a side view of the bonded microgyroscope according to one embodiment of the present invention.

FIG. 2 shows a side view of the completed microgyroscope 100 according to one embodiment of the present invention. Once constructed, the vertical post 120 is supported by a series of flanges 150. The flanges 150 allow the vertical post 120 to rest upon the baseplate. As can be seen in FIG. 2, the flanges 150 are positioned at approximately the mid-point of the vertical post 120. Because the vertical post 120 is connected to the baseplate 135 via the flanges 150 at approximately the mid-point, the vertical post 120 is free to move in a rocking motion in the x-direction 105 and the y-direction 110. Under input rotation, the Coriolis force causes the vertical post 120 to move in the orthogonal direction to the drive motor. The rotation rate sensitivity is proportional to the input rotation rate, the drive amplitude, and the quality factor of the resonator.

Because each portion of the microgyroscope 100 is constructed from a silicon wafer, the performance variations from device to device is reduced. Further, the behavior of each portion of the microgyroscope 100 under varying temperature conditions is more consistent.

Numerous variations and modifications of the invention will become readily apparent to those skilled in the art. Accordingly, the invention may be embodied in other specific forms without departing from its spirit or essential characteristics.

What is claimed is:

1. A microgyroscope comprising:
   a first portion of a vertical post and a clover leaf structure formed from a first silicon wafer; and
   a second portion of the vertical post and a baseplate formed from a second silicon wafer; wherein the first portion of the vertical post and the clover leaf structure are bonded to the second portion of the vertical post and the baseplate.

2. The microgyroscope of claim 1, wherein the clover-leaf structure includes a plurality of capacitors positioned proximate the vertical post.

3. The microgyroscope of claim 2, wherein the plurality of capacitors provide an excitation force for the vertical post.

4. The microgyroscope of claim 1, wherein the vertical post is free to move in a z-axis.

5. The microgyroscope of claim 1, wherein the microgyroscope is bonded at approximately a mid-portion of the vertical post.

6. The microgyroscope of claim 1, wherein the bond is a metal-to-metal bonding.

7. A method of constructing a microgyroscope comprising:
   forming a first section of the microgyroscope having a first portion of a vertical post and a clover-leaf structure on a first substrate;
   forming a second section of the microgyroscope having a second portion of the vertical post and a baseplate on a second substrate; and
   bonding the first section of the microgyroscope to the second section of the microgyroscope.

8. The method of claim 7, further comprising forming a single vertical post from the first portion and the second portion.

9. The method of claim 7, wherein the first substrate and the second substrate have similar thermal properties.

10. The method of claim 7, wherein the vertical post is free to move in a z-axis.

11. The method of claim 7, further comprising forming support flanges on the first portion of the vertical post.

12. The method of claim 7, wherein the bonding is a metal-to-metal bonding.

13. A method of constructing a microgyroscope comprising:
   forming a first portion of a post and a first plurality of capacitors on a first substrate;
   forming a second portion of the post and a baseplate on a second substrate; and
   bonding the first portion of the post and the first plurality of capacitors to the second portion of the post and the baseplate.

14. The method of claim 13, further comprising creating the bonding at approximately a mid-point of the microgyroscope.

15. The method of claim 13, further comprising positioning the plurality of capacitors proximate the post.

16. The method of claim 13, wherein the plurality of capacitors form a clover-leaf structure.

17. The method of claim 13, further comprising forming support flanges on the first portion of the post.

18. The method of claim 13, wherein the bonding is a metal-to-metal bonding.

* * * * *